United States Patent
Tobin et al.

(10) Patent No.: US 9,869,295 B2
(45) Date of Patent: *Jan. 16, 2018

(54) ATTACHMENT METHOD TO INSTALL COMPONENTS, SUCH AS TIP EXTENSIONS AND WINGLETS, TO A WIND TURBINE BLADE, AS WELL AS THE WIND TURBINE BLADE AND COMPONENT

(71) Applicant: General Electric Company, Schenectady, NY (US)

(72) Inventors: James Robert Tobin, Simpsonville, SC (US); William Max Gobeli, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 313 days.

This patent is subject to a terminal disclaimer.

(21) Appl. No.: 14/706,022

(22) Filed: May 7, 2015

(65) Prior Publication Data
US 2016/0327019 A1   Nov. 10, 2016

(51) Int. Cl.
*A46D 1/00* (2006.01)
*B44C 1/17* (2006.01)
(Continued)

(52) U.S. Cl.
CPC ........... *F03D 1/0675* (2013.01); *F03D 13/10* (2016.05); *F05B 2230/60* (2013.01);
(Continued)

(58) Field of Classification Search
USPC ..... 156/60, 72, 91, 196, 212, 229, 230, 233, 156/235, 241, 247, 289, 290, 291, 718,
(Continued)

(56) References Cited

U.S. PATENT DOCUMENTS

RE19,412 E    1/1935  Zaparka
2,450,440 A  10/1948  Mills
(Continued)

FOREIGN PATENT DOCUMENTS

EP    2 653 717 A1   10/2013
EP      3037655 A1    6/2016
(Continued)

OTHER PUBLICATIONS

Co-Pending U.S. Appl. No. 13/609,719, filed Sep. 11, 2012.
European Search Report and Opinion issued in connection with corresponding EP Application No. 16168397.4 dated Sep. 28, 2016.

*Primary Examiner* — Sing P Chan
(74) *Attorney, Agent, or Firm* — Dority & Manning, P.A.

(57) ABSTRACT

A method is provided for installing an add-on component to a surface of a wind turbine blade, as well as the blade with attached add-on component, and the add-on component as a stand-alone device. A slot is defined in one or both of the pressure side or suction side surfaces of the add-on component. The adhesive side of strips of a double-sided adhesive tape are attached onto either the surface of the wind turbine blade or an interior surface of the add-on component, the tape strips having a release liner on an opposite exposed side thereof. The tape strips are arranged longitudinally along one or both sides of the slot, and each strip has an extension tail that extends beyond an edge of the add-on component when component is held at a desired position against the surface of the wind turbine blade. The extension tails are pulled along the slot at an angle such that that release liner is removed through the slot along the length of the tape strip while maintaining the desired position of the add-on component against the surface of the wind turbine blade.

7 Claims, 4 Drawing Sheets

(51) Int. Cl.

| | | |
|---|---|---|
| B63H 1/26 | (2006.01) | |
| F03D 11/02 | (2006.01) | |
| B64C 11/16 | (2006.01) | |
| B64C 11/24 | (2006.01) | |
| D05C 15/00 | (2006.01) | |
| B32B 15/04 | (2006.01) | |
| B64C 27/46 | (2006.01) | |
| F04D 29/38 | (2006.01) | |
| B32B 3/06 | (2006.01) | |
| F03B 3/12 | (2006.01) | |
| B32B 33/00 | (2006.01) | |
| B32B 37/00 | (2006.01) | |
| B32B 38/10 | (2006.01) | |
| B32B 5/00 | (2006.01) | |
| F01D 5/14 | (2006.01) | |
| F01D 5/18 | (2006.01) | |
| B29C 51/16 | (2006.01) | |
| B29C 65/00 | (2006.01) | |
| B29C 63/00 | (2006.01) | |
| F03B 7/00 | (2006.01) | |
| B63H 7/02 | (2006.01) | |
| B32B 7/04 | (2006.01) | |
| B32B 7/12 | (2006.01) | |
| B32B 7/14 | (2006.01) | |
| B32B 9/00 | (2006.01) | |
| F03D 1/06 | (2006.01) | |
| F03D 13/10 | (2016.01) | |

(52) U.S. Cl.
CPC ..... *F05B 2230/80* (2013.01); *F05B 2240/302* (2013.01); *Y02E 10/721* (2013.01); *Y02P 70/523* (2015.11)

(58) Field of Classification Search
USPC ...... 156/719; 428/40.1, 41.8, 100, 343, 352, 428/354; 416/223 R, 224, 228, 229 R, 416/241 R, 235, 236 A, 236 R
See application file for complete search history.

(56) References Cited

U.S. PATENT DOCUMENTS

| | | |
|---|---|---|
| 3,137,887 A | 6/1964 | Manning et al. |
| 3,528,753 A | 9/1970 | Dutton et al. |
| 3,586,460 A | 6/1971 | Toner |
| 4,236,873 A * | 12/1980 | Sherman ............... F03D 1/0658 416/204 R |
| 4,329,119 A | 5/1982 | Baskin |
| 4,626,172 A | 12/1986 | Mouille et al. |
| 5,088,665 A | 2/1992 | Vijgen et al. |
| 5,346,367 A | 9/1994 | Doolin et al. |
| 6,890,152 B1 | 5/2005 | Thisted |
| 7,059,833 B2 | 6/2006 | Stiesdal et al. |
| 7,458,777 B2 | 12/2008 | Herr |
| 7,637,721 B2 | 12/2009 | Driver et al. |
| 7,988,421 B2 | 8/2011 | Bakhuis et al. |
| 8,083,488 B2 | 12/2011 | Fritz |
| 8,162,590 B2 | 4/2012 | Haag |
| 8,376,450 B1 | 2/2013 | Long et al. |
| 8,678,746 B2 | 3/2014 | Haag |
| 9,638,164 B2 * | 5/2017 | Vedula ................. F03D 1/0658 |
| 2003/0141721 A1 | 7/2003 | Bartlett ............... F03D 1/0675 290/55 |
| 2004/0130842 A1 * | 7/2004 | Johansen ............. H02G 13/00 361/117 |
| 2005/0186081 A1 * | 8/2005 | Mohamed ............ B29C 70/24 416/226 |
| 2007/0036659 A1 * | 2/2007 | Hibbard ................ B29C 63/22 416/233 |
| 2007/0065290 A1 | 3/2007 | Herr |
| 2007/0077150 A1 | 4/2007 | Llorente Gonzalez |
| 2009/0068018 A1 * | 3/2009 | Corten .................. F03D 1/0641 416/223 R |
| 2009/0074585 A1 | 3/2009 | Koegler et al. |
| 2009/0146433 A1 * | 6/2009 | Althoff ................. B29C 70/845 290/55 |
| 2009/0285682 A1 * | 11/2009 | Baker ................... F03D 1/0641 416/1 |
| 2010/0062238 A1 * | 3/2010 | Doyle .................... B29C 70/02 428/295.1 |
| 2010/0132884 A1 * | 6/2010 | Baehmann ............ B29C 66/543 156/293 |
| 2010/0135806 A1 | 6/2010 | Benito |
| 2010/0135815 A1 * | 6/2010 | Bagepalli .............. F03D 1/0675 416/226 |
| 2010/0148010 A1 * | 6/2010 | Hunter ...................... B64C 3/28 244/199.4 |
| 2010/0260612 A1 * | 10/2010 | Vasudeva .............. F03D 1/0675 416/227 R |
| 2010/0266408 A1 * | 10/2010 | Dawson ................. H02G 13/00 416/87 |
| 2010/0296940 A1 | 11/2010 | Zuteck |
| 2010/0296941 A1 | 11/2010 | Zuteck |
| 2011/0018282 A1 | 1/2011 | Hayashi et al. |
| 2011/0076149 A1 | 3/2011 | Santiago et al. |
| 2011/0097326 A1 | 4/2011 | Luehrsen |
| 2011/0135467 A1 | 6/2011 | Saddoughi et al. |
| 2011/0135485 A1 * | 6/2011 | Wang .................... F03D 1/0675 416/226 |
| 2011/0142635 A1 | 6/2011 | Frizt |
| 2011/0142636 A1 * | 6/2011 | Curtin .................. F03D 1/0658 416/62 |
| 2011/0142663 A1 * | 6/2011 | Gill ....................... F03D 1/0675 416/226 |
| 2011/0142667 A1 | 6/2011 | Miebach et al. |
| 2011/0142668 A1 | 6/2011 | Rao |
| 2011/0142679 A1 * | 6/2011 | Bendel ................. B29C 66/721 416/241 R |
| 2011/0206529 A1 * | 8/2011 | Bell ........................ B29C 65/48 416/226 |
| 2011/0221093 A1 * | 9/2011 | Perrow ................... B29C 70/44 264/255 |
| 2011/0223028 A1 | 9/2011 | Stege et al. |
| 2011/0223032 A1 * | 9/2011 | Tobin ................. B29D 99/0025 416/229 R |
| 2011/0243736 A1 | 10/2011 | Bell |
| 2011/0243750 A1 * | 10/2011 | Gruhn ..................... B29B 11/16 416/226 |
| 2011/0243751 A1 * | 10/2011 | Fritz ........................ F03D 15/00 416/241 R |
| 2011/0268558 A1 | 11/2011 | Driver |
| 2012/0027590 A1 | 2/2012 | Bonnet |
| 2012/0100005 A1 * | 4/2012 | Kristensen ............ F03D 1/0608 416/241 R |
| 2012/0121430 A1 | 5/2012 | Olsen et al. |
| 2012/0134817 A1 * | 5/2012 | Bagepalli .............. F03D 1/0675 416/62 |
| 2012/0134838 A1 * | 5/2012 | Jimenez ................... B29C 61/00 416/229 R |
| 2012/0141281 A1 * | 6/2012 | Carroll ................. F03D 1/0641 416/219 A |
| 2012/0257977 A1 * | 10/2012 | Jensen .................. F03D 1/0608 416/223 R |
| 2012/0257978 A1 * | 10/2012 | Jensen .................. F03D 1/0608 416/223 R |
| 2012/0257979 A1 * | 10/2012 | Jensen .................. F03D 1/0608 416/223 R |
| 2012/0301316 A1 * | 11/2012 | Velez Oria ........... F03D 1/0675 416/233 |
| 2013/0108457 A1 * | 5/2013 | Thrue ................... F03D 1/0641 416/236 R |
| 2013/0177433 A1 * | 7/2013 | Fritz ..................... F03D 1/0675 416/226 |
| 2013/0177434 A1 * | 7/2013 | Baucke ................... H01Q 17/00 416/229 R |

(56) References Cited

U.S. PATENT DOCUMENTS

| | | | |
|---|---|---|---|
| 2013/0177435 A1* | 7/2013 | Baucke | F03D 1/0675 416/230 |
| 2013/0177436 A1* | 7/2013 | Baucke | F03D 1/0675 416/232 |
| 2013/0323070 A1* | 12/2013 | Grabau | F03D 1/0675 416/229 R |
| 2014/0072441 A1* | 3/2014 | Asheim | F03D 1/0608 416/241 R |
| 2014/0093378 A1* | 4/2014 | Clavette | B64C 11/205 416/224 |
| 2014/0119931 A1* | 5/2014 | Datta | B29C 70/443 416/223 R |
| 2014/0119933 A1* | 5/2014 | Bagepalli | F03D 1/0675 416/226 |
| 2014/0119937 A1* | 5/2014 | Fang | B29C 70/56 416/233 |
| 2014/0169978 A1* | 6/2014 | Livingston | F03D 1/0675 416/226 |
| 2014/0186175 A1 | 7/2014 | Baehmann et al. | |
| 2014/0227101 A1* | 8/2014 | Yao | F03D 1/0608 416/236 R |
| 2014/0286780 A1* | 9/2014 | Lemos | F03D 1/0675 416/210 R |
| 2014/0328692 A1 | 11/2014 | Riddell et al. | |
| 2014/0369845 A1* | 12/2014 | Ruijter | F01D 5/141 416/224 |
| 2015/0037112 A1* | 2/2015 | Nagabhushana | B60P 7/02 410/44 |
| 2015/0118058 A1* | 4/2015 | Vedula | F03D 1/0675 416/236 R |
| 2015/0132135 A1* | 5/2015 | Booth | F01D 5/30 416/204 R |
| 2015/0132138 A1* | 5/2015 | Herr | F01D 5/12 416/223 A |
| 2015/0267681 A1* | 9/2015 | Ruijter | F03D 13/10 415/208.2 |
| 2015/0275855 A1* | 10/2015 | Pal | F03D 13/10 416/224 |
| 2015/0330231 A1* | 11/2015 | McGuire | F01D 5/28 428/36.9 |
| 2016/0009372 A1* | 1/2016 | Grip | B64C 3/28 244/214 |
| 2016/0047252 A1* | 2/2016 | Merzhaeuser | B29C 70/00 416/229 A |
| 2016/0281680 A1* | 9/2016 | Randall | F03D 1/0683 |
| 2016/0305399 A1* | 10/2016 | Spandley | B29C 70/342 |
| 2016/0319801 A1* | 11/2016 | Smith | B29C 70/44 |
| 2016/0327019 A1* | 11/2016 | Tobin | F03D 1/0675 |
| 2016/0327020 A1* | 11/2016 | Tobin | F03D 1/0633 |
| 2016/0327021 A1* | 11/2016 | Tobin | F03D 1/0675 |
| 2016/0348643 A1* | 12/2016 | Fujioka | F03D 1/0675 |
| 2017/0058868 A1* | 3/2017 | Caruso | F03D 1/0683 |
| 2017/0101979 A1* | 4/2017 | Tobin | F03D 1/0658 |
| 2017/0121877 A1* | 5/2017 | Ramachandran | F03D 1/0675 |
| 2017/0137116 A1* | 5/2017 | Ireland | B64C 23/06 |
| 2017/0165923 A1* | 6/2017 | Chen | B29C 70/36 |
| 2017/0218916 A1* | 8/2017 | Madsen | F03D 1/0641 416/223 R |

FOREIGN PATENT DOCUMENTS

| | | |
|---|---|---|
| WO | WO 2012/076168 A2 | 6/2012 |
| WO | WO 2013/023745 A1 | 2/2013 |
| WO | WO 2013/178624 A2 | 12/2013 |

* cited by examiner

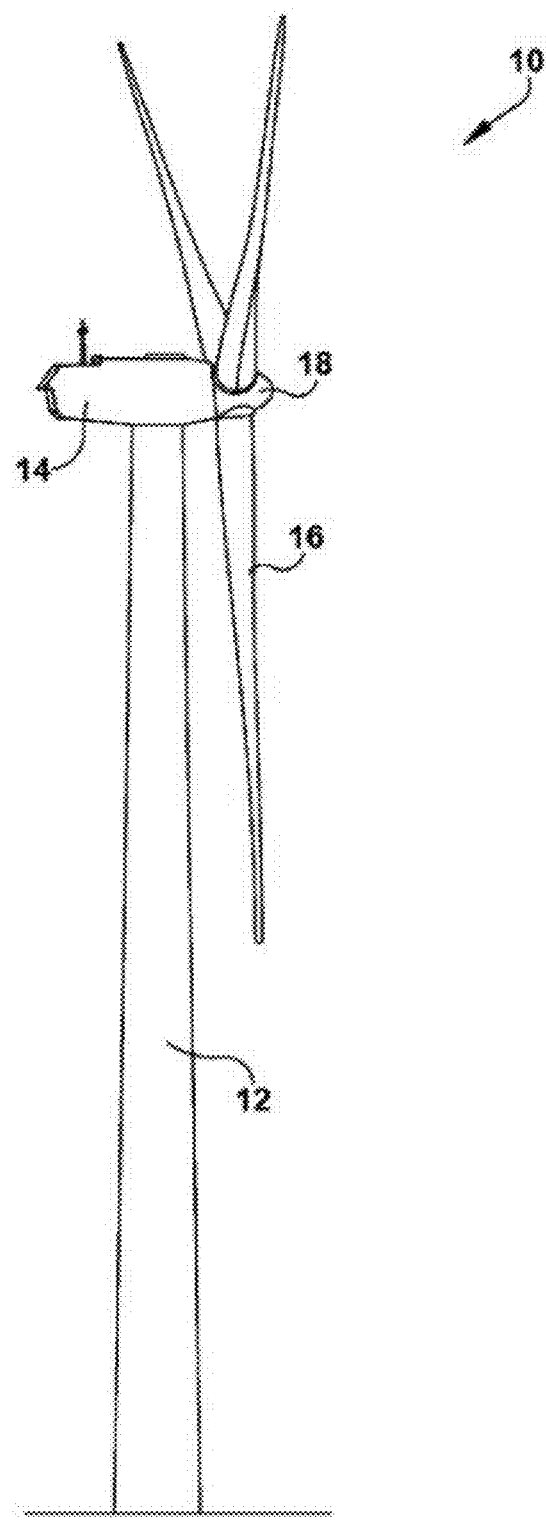
FIG. -1-

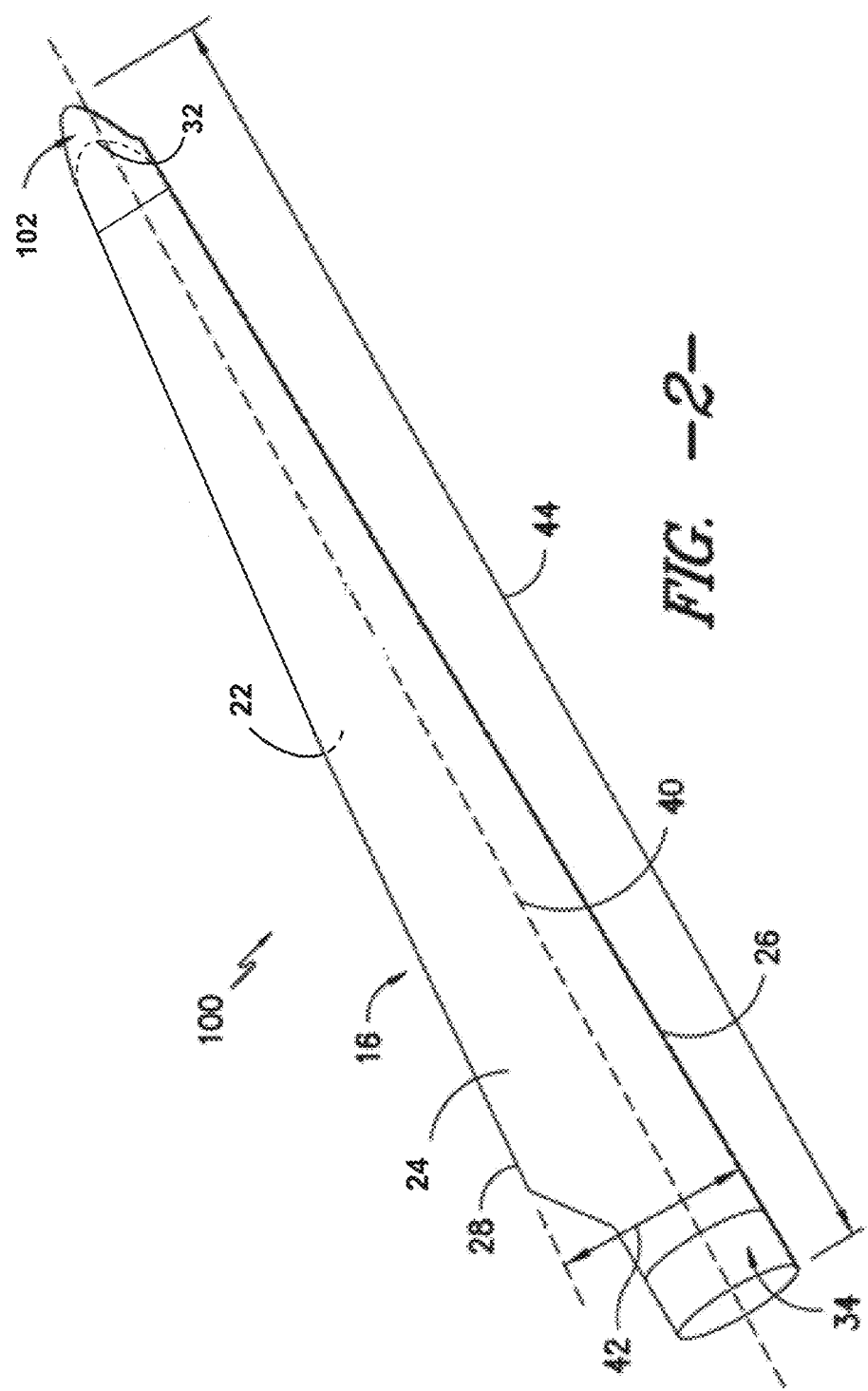
FIG. -2-

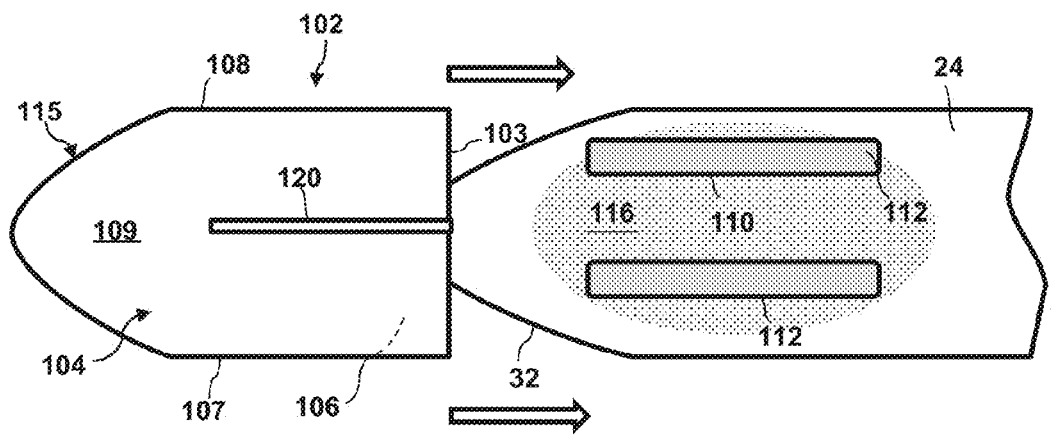
FIG. -3-
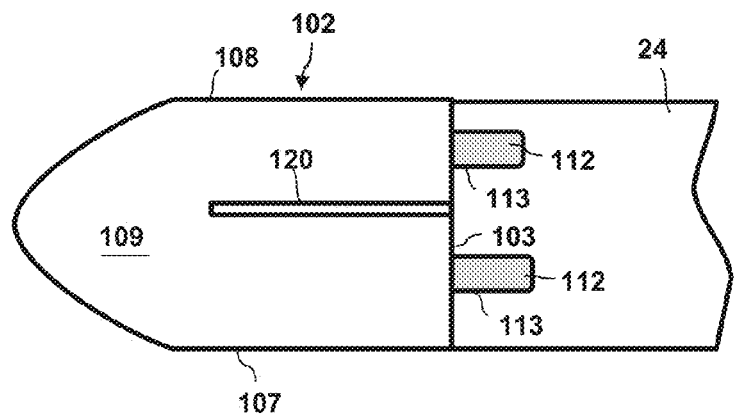
FIG. -4-
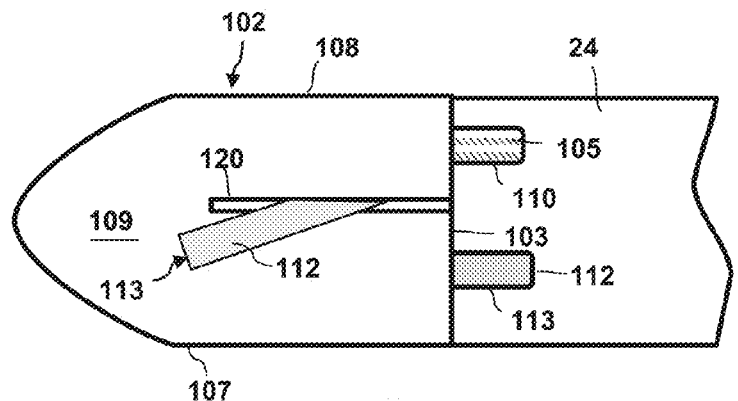
FIG. -5-

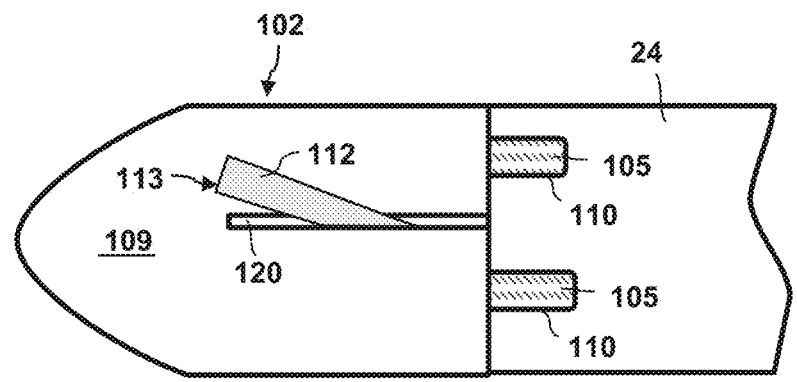
FIG. -6-
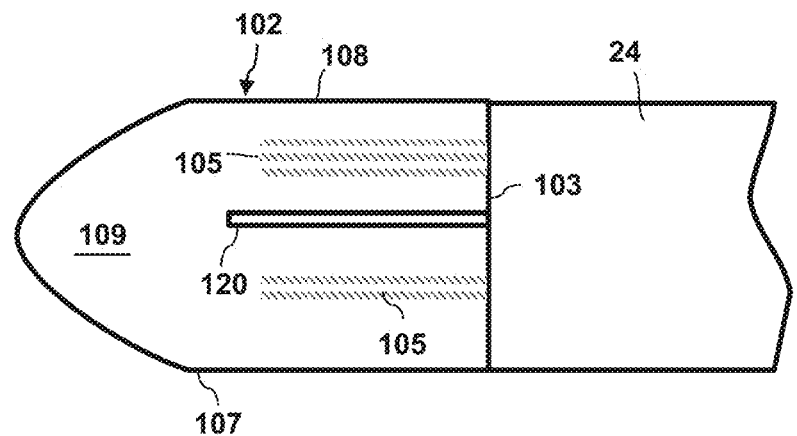
FIG. -7-

ATTACHMENT METHOD TO INSTALL COMPONENTS, SUCH AS TIP EXTENSIONS AND WINGLETS, TO A WIND TURBINE BLADE, AS WELL AS THE WIND TURBINE BLADE AND COMPONENT

FIELD OF THE INVENTION

The present disclosure relates in general to wind turbine rotor blades, and more particularly to a system and method for attaching components, such as tip extensions, winglets, and vortex generators to the wind turbine blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, accessory components are attached to the rotor blades of wind turbines to perform various functions during operation of the wind turbine. For example, it is known to change the aerodynamic characteristics of wind turbine rotor blades by adding protrusions or other structures to the surface of the blade in order to increase the energy conversion efficiency during normal operation of the wind turbine by increasing the lift force of the blades while decreasing the drag force. Such components include, for example, winglets, tip extensions, and vortex generators. The purposes and operational principals of these devices are well understood by those skilled in the art.

The installation techniques and systems for attaching conventional add-on components can be expensive and time consuming, particularly for field installations. For example, typical field installation techniques require the use of attachment fixtures and significant dwell time for curing the attachment adhesives. The adhesives typically are considered hazardous materials and appropriate precautions and protective measures (both equipment and personal) must be taken. In addition, the smearing of liquid or past adhesives while pushing the add-on components into place can result in inconsistent and unpredictable results, particularly for tip extension add-ons that are pushed onto the tip end of an existing blade in the field.

The industry has recognized that double-sided strain isolation tapes offer substantial benefits for attaching add-on components, but the use of such tapes has proven to be challenging to precisely install the components (especially larger components) due to the instant bond once the tape makes contact with a mating surface. Repositioning of the part can be difficult, if not impossible.

U.S. Pat. Pub. No. 2014/0328692 describes a vortex generator accessory that is mounted to either of the suction side or pressure side of a wind turbine blade and includes a base portion and a protrusion member extending upwardly from the base portion. An attachment layer connects the base portion to the suction or pressure side. The attachment layer has a lower shear modulus than the base portion to allow for shear slippage between the base portion and the underlying suction or pressure side. The attachment layer may be a foam-based strip member with adhesive on opposite interface sides thereof. For example, this attachment layer may be Very High Bond (VHB™) or SAFT (Solar Acrylic Foam Tape) foam-based strip material.

Thus, the industry is continuously seeking improved methods for installing add-on components to wind turbine blades in a fast and low-cost operation that also provides for a repositioning opportunity to ensure accurate add-on component placement.

BRIEF DESCRIPTION OF THE INVENTION

Aspects and advantages of the invention will be set forth in part in the following description, or may be obvious from the description, or may be learned through practice of the invention.

In accordance with aspects of the invention, a method for installing an add-on component to a surface of a wind turbine blade is provided. The add-on component has a body with an open span-wise end, a pressure side surface, and a suction side surface. A slot is defined in one or both of the pressure side or suction side surfaces of the add-on component;

The method includes attaching an adhesive side of one or more strips of a double-sided adhesive tape (referred to collectively herein as "tape strips") onto either surface of the wind turbine blade (pressure side or suction side surface) or an interior surface of the add-on component, with the tape strips having a release liner on their opposite exposed side.

Each of the tape strips has an extension tail of the release liner that extends beyond the open span-wise end of the add-on component when the add-on component is placed and held at a desired position against the surface of the wind turbine blade. This extension tail may be an extension of the release liner itself, or another component (e.g., wire or string) attached to the release liner. The tape strips are arranged longitudinally along one or both sides of the slot. With the add-on component held at the desired position, the extension tail is pulled along (e.g., through) the slot at an angle such that that release liner is removed through the slot along the length of the tape strip while maintaining position of the add-on component against the surface of the wind turbine blade. In this manner, the adhesive under the release liner is exposed and attaches to either the surface of the wind turbine blade or the surface of the add-on component. If needed, the extension tails can then be trimmed from the tape strips.

The above embodiment is particularly useful when the add-on component slides onto and overlaps a portion of the wind turbine blade, such as when the add-on component is a tip extension or winglet, and the slot is a span-wise extending slot in the add-on component.

In one version of the above embodiment, the tape strips are initially attached to the add-on component along opposite sides of the slot. Thus, as the release liner is peeled away from the add-on component through the slot (by pulling the extension tail), the adhesive under the release liner attaches to the surface of the wind turbine blade.

In another embodiment, the tape strips are initially attached to the surface of the wind turbine blade at a location corresponding to opposite sides of the slot. The add-on component is pressed onto the tape strips and the release liners are peeled away from the blade surface (by pulling on the extension tail) through the slot so that the adhesive under the release liner attaches to the surface of the add-on component.

Embodiments may further include applying an additional attaching mechanism between the add-on component and the surface of the wind turbine blade in areas between or adjacent to the tape strips. The additional mechanism may be an adhesive paste or liquid, a mechanical fastener such as a hook-and loop material, or one or more pieces of the double-sided adhesive tape located between or adjacent the tape strips with the release liner removed from both sides to achieve an initial placement bonding between the add-on component and the surface of the wind turbine blade upon placement of the add-on component at the desired position.

It should be appreciated that the present methodology is not limited to attachment of any particular type of add-on component. For example, the add-on component may be any one or combination of a vortex generator, tip extension, winglet, leading edge extension, trailing edge extension or serration, blade fence, spoiler, blade skin, or instrumentation.

The present invention encompasses any manner of wind turbine blade having an add-on component attached in accordance with the methods described herein.

The invention also encompasses various embodiments of an add-on component as a stand-alone device for subsequent attachment to a wind turbine blade tip. The add-on component may include any of the features discussed above or described in greater detail below.

It should be appreciated that the methods described herein may be implemented with a number of different commercially available double-sided adhesive tapes. These tapes generally have a lower shear modulus than the base portion of the add-on component to allow for shear slippage between the base portion and the underlying blade surface. For example, the tape strips may be a foam-based strip member with adhesive on opposite interface sides thereof, such as a Very High Bond (VHB™) or SAFT (Solar Acrylic Foam Tape) foam-based strip material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a conventional wind turbine;

FIG. 2 is a perspective view of an embodiment of a rotor blade assembly with an add-on component in accordance with the present disclosure;

FIG. 3 is a partial top view of an add-on component in the form of a wing tip extension being assembled to a rotor blade tip in accordance with aspects of the invention;

FIG. 4 is a partial top view of the embodiment of FIG. 3 at a subsequent assembly step;

FIG. 5 is a partial top view of the embodiment of FIG. 4 at still a further assembly step;

FIG. 6 is a partial top view of the embodiment of FIG. 5 at yet a further assembly step; and FIG. 7 is a partial top view of the embodiment of FIG. 6 in a final assembly step.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a wind turbine blade assembly 100 is illustrated with a an add-on component 102 in the form of a tip extension attached to a surface 24 (e.g., suction side surface) of the blade 16 in accordance with aspects of the present invention. The blade 16 has a pressure side 22 and a suction side 24 extending between a leading edge 26 and a trailing edge 28, and extends from a blade tip 32 to a blade root 34. The blade 16 further defines a pitch axis 40 relative to the rotor hub 18 (FIG. 1) that typically extends perpendicularly to the rotor hub 18 and blade root 34 through the center of the blade root 34. A pitch angle or blade pitch of the blade 16, i.e., an angle that determines a perspective of the rotor blade 16 with respect to the air flow past the wind turbine 10, may be defined by rotation of the blade 16 about the pitch axis 40.

The wind turbine blade assembly 100 defines a chord 42 and a span 44. As shown in FIG. 2, the chord 42 may vary throughout the span 44 of the rotor blade 16. Thus, a local chord may be defined for the blade 16 at any point on the blade 16 along the span 44.

It should be appreciated that the present method for forming a blade assembly 100 in accordance with aspects of the invention by attaching an add-on component 102 is relevant to attaching any component to any outside surface of the blade 16. The method is particularly useful for an add-on component that slides onto the blade tip 32 and overlaps at least a portion of the pressure 22 and suction 24 side surfaces of the blade 16. For example, referring to FIG. 3, the add-on component 102 has a generally hollow body 104 configured as a blade tip extension 115 having an open span-wise end 103, a closed leading edge 108, and a closed trailing edge 107. The add-on component includes a suction side surface 106 and a pressure side surface 109.

Although FIG. 3 depicts (by arrows) the add-on component 102 being slid linearly in a span-wise direction onto the blade 16, it should be appreciated that this sliding motion may include a chord-wise direction component.

Referring to FIGS. 3 through 7 in general, the add-on component 102 includes a span-wise slot 120 defined therein. This slot 120 can be defined at any location on the component 102. For example, in the illustrated embodiments, the slot 102 is defined in the pressure side surface 109 of the component 102 and extends span-wise (e.g., longitudinally) from the open span-wise end 103. In certain embodiments, a single slot 120 is defined in either of the pressure side 109 or suction side 106 surface. In other embodiments, a slot 120 may be defined in each of the pressure and suction side surfaces 109, 106. The slots 120 may be defined at any location between the leading edge 108 and trailing edge 107 of the add-on component 102.

Referring to FIG. 3, double-sided adhesive tape strips 110 are initially attached onto the blade surface 24 adjacent to the tip 32 with the release liners 112 remaining attached to the exposed side of the tape strips 110. The tape strips 110 are arranged on the blade surface 24 so as to extend span-wise along one or both sides of the slot 120 as the add-on component 102 is slid onto the blade tip 32, as depicted in FIGS. 3 and 4.

Each of the tape strips 110 has a length so as to define an extension tail 113 that extends span-wise beyond the span-wise end 103 of the add-on component 102. The length of the extension tails 113 may vary. For example, the strips 110 furthest from the slot 120 may have a longer extension tail 113 to facilitate pulling the extension tail through the slot 120, as compared to the tape strip 110 closest to the slot 120. The extension tail 113 may be defined by the portion of the release liner 112 that extends beyond the end 103 of the add-on component. Alternatively, the extension tail 113 may encompass any other material or component that is attached to the release liner 112, such as a wire, string, ribbon, and so forth. With the illustrated embodiments, because the extension tails 113 are comprised of the release liner 112 and underlying adhesive, as depicted in FIG. 4, after removal of the release liner 112, the remaining adhesive layer of the tape strips adhesive 111 remains, as depicted in FIGS. 5 and 6, and may need to be trimmed.

In FIG. 5, the release liner 112 on the upper tape strip 110 is peeled away and then pulled through the slot 120. The release liner 112 is pulled in a direction away from the blade surface 24 through the slot 120 until the release liner 112 is removed from the entire length of the tape strip 110 underlying the blade tip extension 115. It should be appreciated that, upon removal of the release liner 112, the adhesive 105 is exposed adjacent to the blade tip extension 115, which is then pressed onto the exposed adhesive.

FIG. 6 depicts the release liner 112 of the lower tape strip 110 being pulled through the slot 120 until the release liner 112 is removed from the entire length of the tape strip 110, as discussed above, exposing the adhesive 105. Once the adhesive 105 has been exposed for both of the tape strips 110, the blade tip extension 115 can be firmly pressed onto the blade surface 24.

As depicted in FIG. 6, the exposed adhesive 105 portion of the tape strips 110 will remain after the release liners 112 have been peeled away. These exposed adhesive portions 105 can be trimmed away to give the finished assembly as depicted in FIG. 7.

It should be appreciated that the present method also encompasses embodiments wherein the tape strips 110 are initially attached to an interior surface of the add-on component 102 along opposite sides of the slot(s) 120. With such embodiments, as the release liner is removed from the tape strips 110 through the slots 120, the exposed adhesive from under the release line attaches to the surface of the wind turbine blade.

FIG. 3 also depicts an additional aspect that may be incorporated into any of the other embodiments described herein. In particular, an adhesive 116 is depicted as underlying the adhesive tape strips 110. In certain embodiments, it may be desired to coat the surface of the blade where the add-on component 102 will be placed with a liquid or paste adhesive (e.g., and epoxy) 116, for example to compensate for any surface irregularities or mismatch between the blade surface and the add-on component 102 due to machining tolerances, before positioning the tape strips 110 on the blade surface 24. The tape strips 110 and add-on component can then be attached before the adhesive 116 cures, which provides a degree of positioning adjustment of the add-on component 102 due to the fact that the adhesive 116 is still in liquid or paste form. Alternatively, the adhesive 116 (with tape strips attached thereto) may be allowed to cure before placement of the add-on component. In either case, this particular embodiment also gives the advantage of a strong bond provided by the adhesive 116 in combination with the shear stress reduction provided by the tape strips 110.

The present invention includes embodiments of a wind turbine blade assembly 100 incorporating an add-on component 102 attached as described above.

The present invention also encompasses an add-on component 102 as a stand-alone device for subsequent attachment to a wind turbine blade, the add-on component 102 having any one or combination of the features described above.

It should be appreciated that the methods described herein may be implemented with a number of different commercially available double-sided adhesive tapes. These tapes generally have a lower shear modulus than the base portion of the add-on component to allow for shear slippage between the base portion and the underlying blade surface. For example, the tape strips may be a foam-based strip member with adhesive on opposite interface sides thereof, such as a Very High Bond (VHB™) or SAFT (Solar Acrylic Foam Tape) foam-based strip material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for installing an add-on component to a surface of a wind turbine blade, the add-on component having a body with an open span-wise end, a pressure side surface, and a suction side surface, the method comprising:
   defining a slot in one or both of the pressure side or suction side surfaces of the add-on component;
   attaching an adhesive side of one or more strips of a double-sided adhesive tape onto either the surface of the wind turbine blade or an interior surface of the add-on component, the tape strips having a release liner on an opposite exposed side thereof;
   the tape strips arranged longitudinally along one or both sides of the slot, and each of the tape strips having an extension tail that extends beyond an edge of the add-on component when the add-on component is placed and held at a desired position against the surface of the wind turbine blade; and with the add-on component held at the desired position, pulling the extension tail along the slot at an angle such that that release liner is removed through the slot along the length of the tape strip while maintaining the desired position of the add-on component against the surface of the wind turbine blade to attach the exposed adhesive from under the release liner to either the surface of the wind turbine blade or the surface of the add-on component.

2. The method as in claim 1, wherein the add-on component has a closed leading edge, a closed trailing edge, further comprising sliding the add-on component onto a tip of the wind turbine blade to the desired position such that the add-on component overlaps a portion of the wind turbine blade and extends span-wise from the tip of the wind turbine blade.

3. The method as in claim 2, wherein the add-on component is one of a tip extension or winglet.

4. The method as in claim 1, wherein the slot is a span-wise slot extending from the open span-wise end of the add-on component.

5. The method as in claim 1, wherein the tape strips are initially attached to the add-on component along opposite sides of the slot, and wherein as the release liner is removed from the tape strips through the slot, the exposed adhesive from under the release line attaches to the surface of the wind turbine blade.

6. The method as in claim 1, wherein the tape strips are initially attached to the surface of the wind turbine blade at a location corresponding to opposite sides of the slot, and wherein as the release liner is removed from the tape strips through the slot, the exposed adhesive from under the release line attaches to the surface of the add-on component.

7. The method as in claim 1, further comprising applying an additional attaching mechanism between the add-on component and the surface of the wind turbine blade in areas between the tape strips.

* * * * *